Aug. 5, 1958

C. W. STOTT 2,846,266

DUMPING TRAILER

Filed Nov. 23, 1954

Clifford W. Stott
INVENTOR.

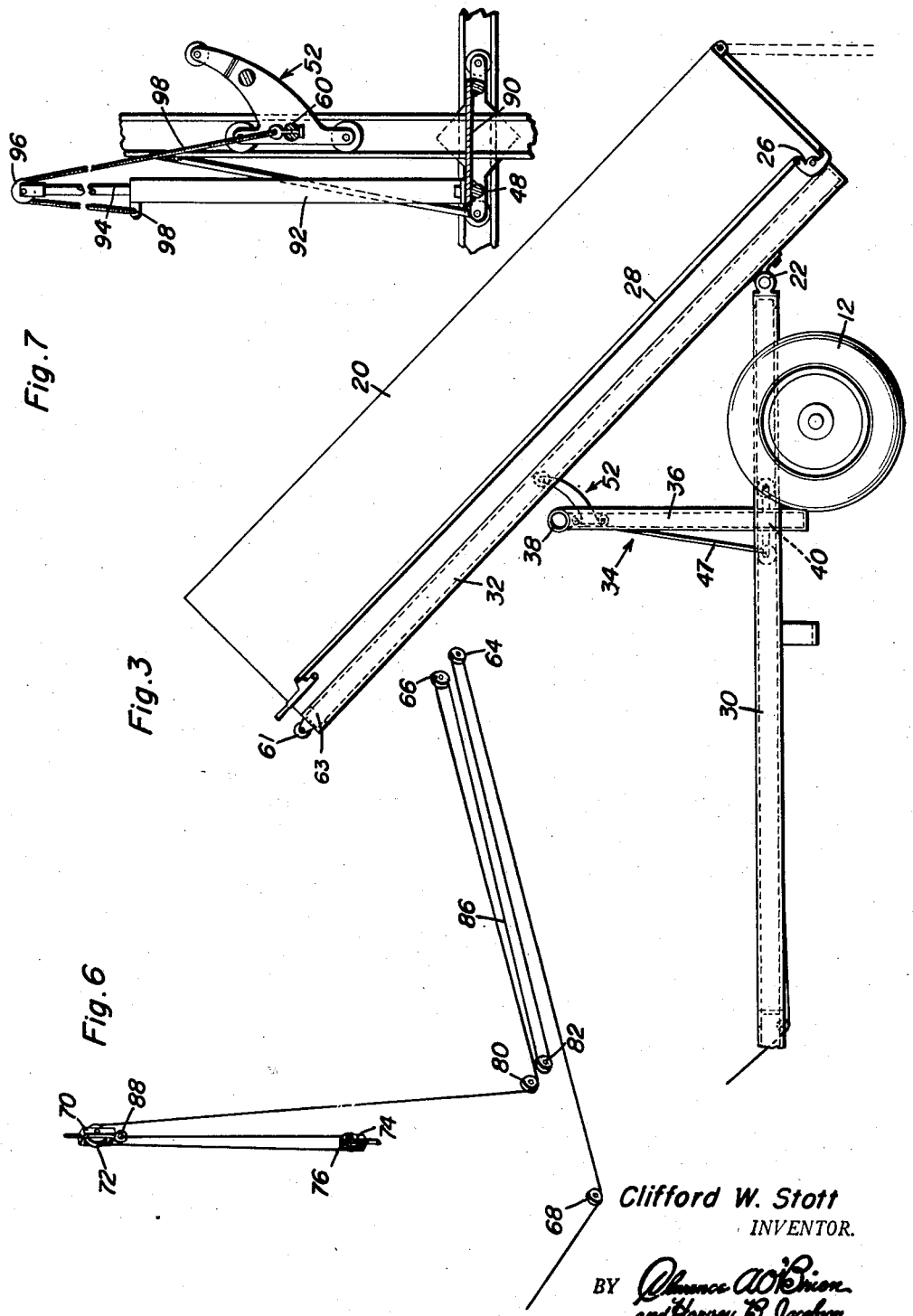

Aug. 5, 1958  C. W. STOTT  2,846,266
DUMPING TRAILER
Filed Nov. 23, 1954  3 Sheets-Sheet 3
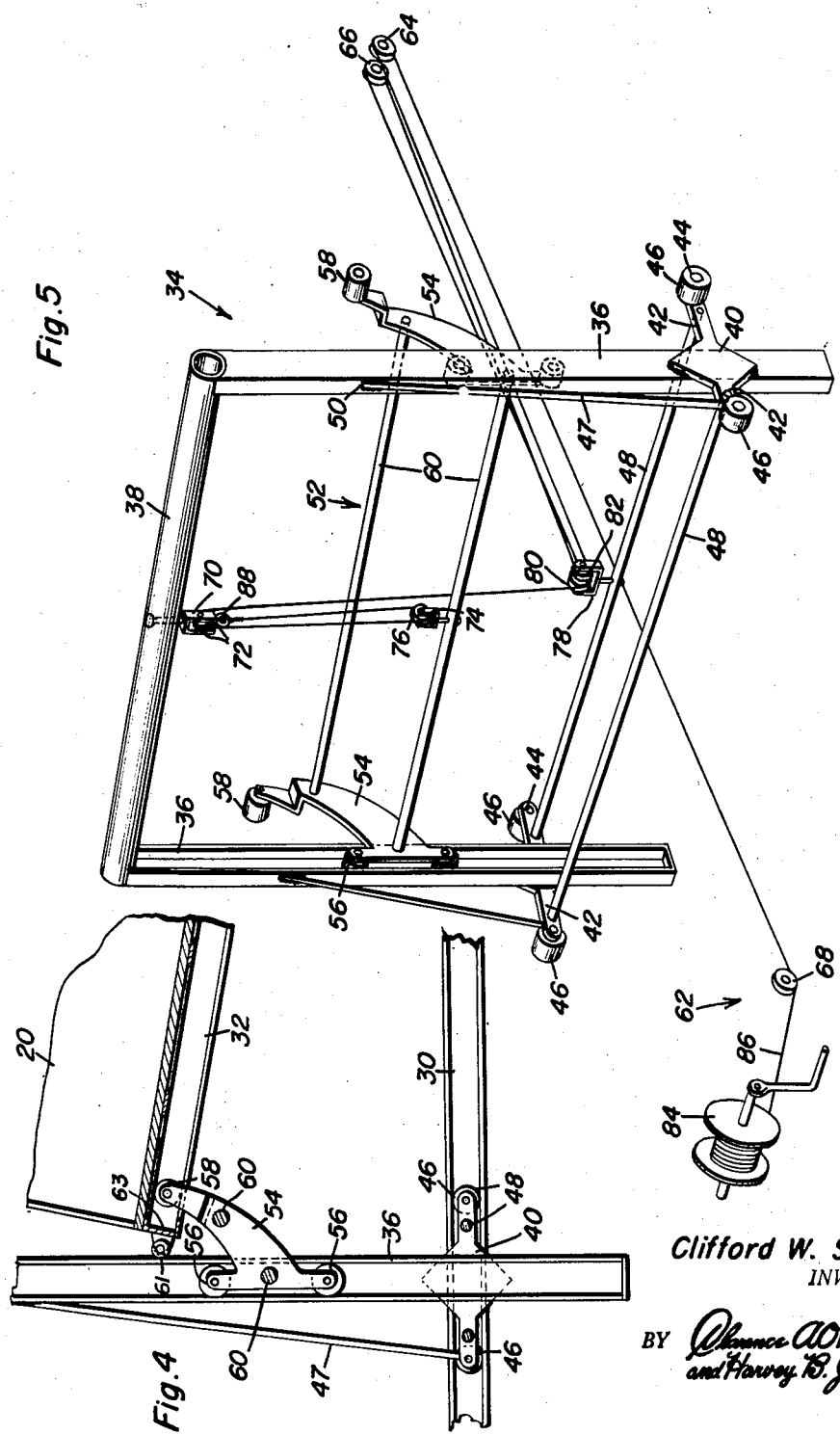
Clifford W. Stott
INVENTOR.

United States Patent Office 2,846,266
Patented Aug. 5, 1958

2,846,266
DUMPING TRAILER
Clifford W. Stott, Phoenix, Ariz.
Application November 23, 1954, Serial No. 470,630
1 Claim. (Cl. 298—19)

The invention relates to vehicles, and more particularly relates to tiltable dump body vehicles wherein there is provided a wheeled supporting frame having a dump body pivoted to the rear end thereof for tilting between a loading and a dumping position.

The primary object of the invention is to provide an improved dumping mechanism for the dump body, particularly adaptable for large dump bodies, such as those ordinarily mounted on trailer chassis frames in tractor trailer combinations.

In accordance with the primary object, it is a further object of the invention to provide a dumping mechanism including a horizontally traveling dolly for movement along the trailer chassis frame, which dolly carries a vertically movable carriage or elevating frame for the dump body pivotally mounted on the wheeled supporting chassis frame.

A further object of the invention is in the provision of a dumping mechanism of the character described, in the foregoing there is provided operating means for moving the dolly horizontally along the wheeled supporting chassis frame operatively connected to the vertically movable carriage whereby initially as the operating means is actuated, the vertically movable carriage moves to partially tilt the dump body, and continued actuation of the operating means moves the dolly rearwardly on the frame to tilt the dump body into final dumping position while maintaining the carriage in an elevated position to increase the tilting movement of the dump body.

A final object of the invention to be mentioned specifically is in the provision of an exceedingly light weight, durable and strong dumping mechanism which is both compact and simple in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view similar to Figure 2 disclosing the dumping body tilted to the limit of its dumping movement and disclosing the movement of the dumping mechanism along the dump body of the trailer chassis frame;

Figure 4 is an enlarged side elevational view in cross-section with the dump body being shown in approximately the tilted position of Figure 2 and disclosing the connection of the dumping mechanism to the dump body and the trailer chassis frame;

Figure 5 is a perspective view of the dumping mechanism and its operating means per se;

Figure 6 is a perspective view of the operating cable arrangement for the dumping mechanism; and Figure 7 is a detail view of an alternate operating means for a portion of the dumping mechanism.

Figure 1:
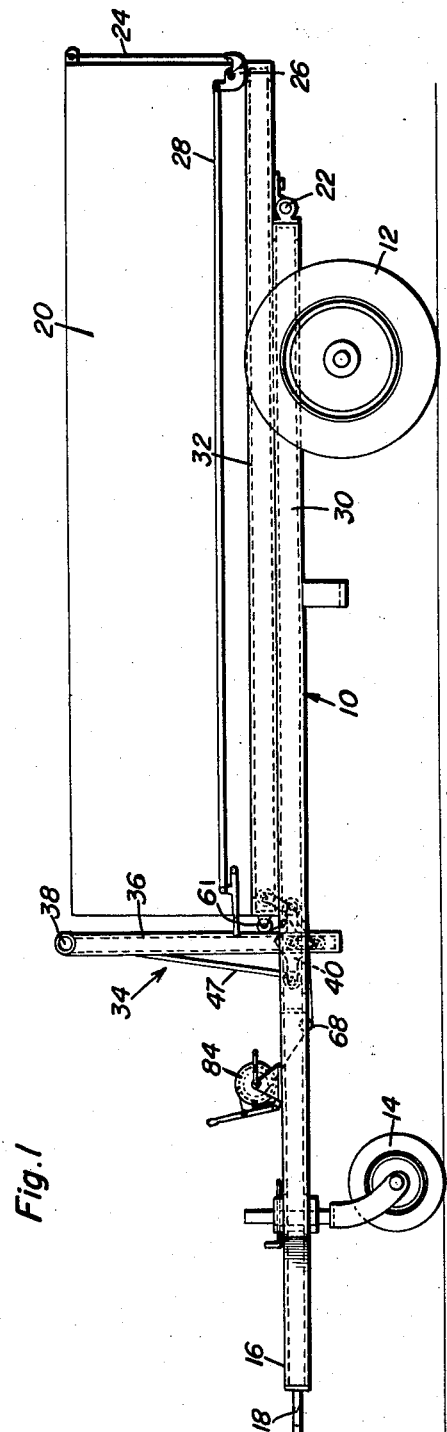
Figure 1 is a side elevational view of a trailer frame having a dump body pivotally mounted thereon and carrying the dumping mechanism constituting the present invention.
Figure 2:
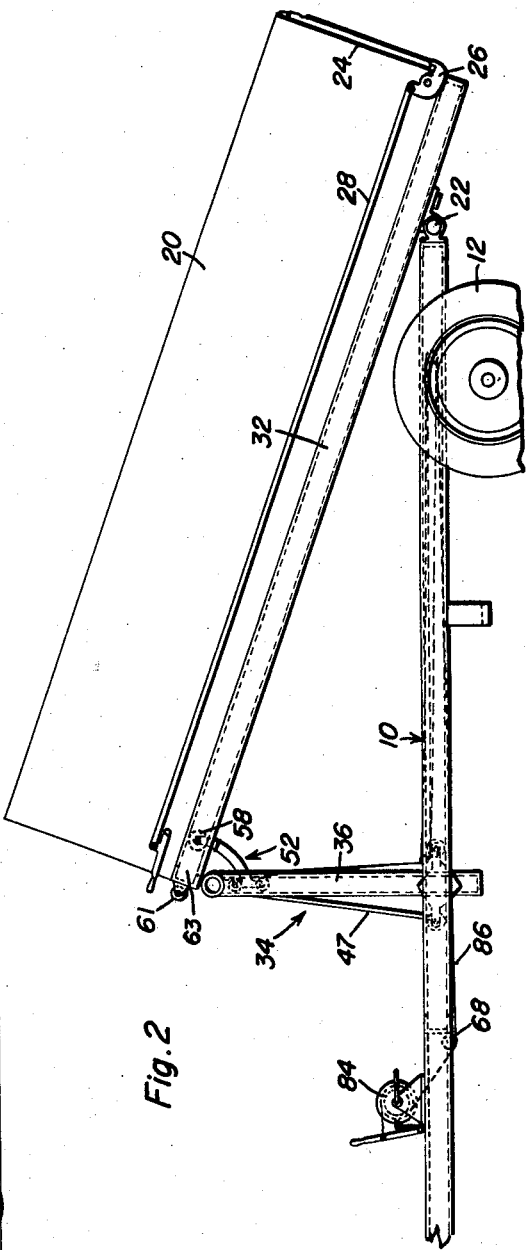
Figure 2 is a side elevational view similar to Figure 1 disclosing the dump body tilted toward a dumping position relative to the trailer frame.

In the drawings, there is shown a substantially rectangular wheeled supporting chassis frame 10 having rear supporting wheels 12 and a forward supporting and turning wheel 14, the frame 10 being substantially rectangular in shape but having a pointed forward end portion 16 with a hitch connection 18 thereon for attaching the frame to a tractor or other powered vehicle for moving the same.

A dump body 20 rests upon the frame 10 in its loading position, as shown in Figure 1, and is hingedly or pivotally attached, as at 22, to the rear end of the frame 10. The dump body 20 includes the usual downwardly swinging end or tail gate 24 normally held in closed position by the latch mechanism 26 which is, in turn, released by the operating linkage 28 extending longitudinally toward the forward end of the dump body 20.

The side frame members of the wheeled supporting frame 10 are preferably formed as inwardly opening channel members 30 which form guide tracks.

Secured to the undersurface of the dump body 20 and extending longitudinally at opposite sides thereof are a pair of spaced, parallel inwardly opening channel members 32 which face one another and form a second set of tracks. In the loading position of the dump body 20, the channel members 32 normally rest upon the channel members 30 of the supporting frame 10.

The dumping mechanism for tilting the dump body 20 from its loading to its dumping positions is designated in its entirety by the numeral 34, this mechanism and its cooperation with the supporting frame 10 and dump body 20 constituting the present invention.

For a clear understanding of the construction of the dumping mechanism 34, attention is directed to Figure 5 wherein the dumping mechanism is seen to comprise essentially a dolly rising from the chassis frame 10 comprising a pair of upright side rails 36 disposed in spaced, parallel relation to one another and interconnected at their upper ends by a transversely extending top frame member 38.

Adjacent their lower ends, each of the side rails 36 is provided with a mounting bracket 40 having aligned legs 42 projecting beyond the opposite edges of each side rail, these legs extending longitudinally of the side frame members 30 of the supporting frame 10 and at right angles to the side rails 36 of the dolly. To the free ends of the legs 42 are attached axles 44 which journal rollers 46 thereon. Tie rods 48 extending between the side rails 36 generally parallel to the top frame member 38 of the dolly are attached at their ends to intermediate portions of the legs 42 to stiffen the same.

To each of the forwardly extending legs 42 of the brackets 40 adjacent the free end thereof is rigidly attached the lower end of a brace rod 47, the upper end of the brace rod being attached as at 50 to the associated side rail 36 adjacent the upper end thereof.

The side rails 36 of the dolly 34 are in the form of inwardly opening vertical channel members disposed in facing relation to one another.

Rollingly supported beteween the channel side rails 36 is an elevating carriage or frame 52, the carriage comprising a pair of rearwardly and upwardly extending, spaced, parallel arms 54, the forward ends of which are provided with vertically spaced rollers 56 riding in the channel side rails 36 and the rearward ends of which are provided with rollers 58. Connecting rods 60 extend between the arms and connect thereto at their ends to rigidify the arms.

The rollers 46 on the brackets 40 secured to the side rails 36 of the dolly 34 guidingly ride between the channel flanges in the channel members 30 of the wheeled supporting frame 10 for horizontal movement between the forward and rear ends of the supporting frame 10.

The rollers 58 on the carriage arms 52 are rollingly engaged in the channel members 32.

With this construction and the arrangement of the dolly 34 relative to the supporting frame 10, the side rails 36 of the dolly are spaced apart a distance less than the width of the dump body 20 and when the dump body 20 is in loading position as shown in Figure 1, the dolly 34 is disposed forwardly of the forward end of the dump body.

At the forward end of the dump body 20, there is provided a pair of rollers 61 which engage the rear sides of rails 36 of the dolly 34 and are mounted on the front ends 63 of the channel members 32.

In the operation of the device, the carriage 52 is first raised in the side rails 36 of the dolly 34 in order to tilt the dump body a sufficient degree into partial dumping position so that the rollers 61 are disengaged from the side rails 36 and disposed above the dolly 34. During the initial movement of the carriage 52 upwardly, the rollers 58 thereof will tend to move forwardly in the channel members 32 of the dump body 20; however, the front ends 63 of the members 32 are blocked off or closed to prohibit such movement, and consequently when the dump body 20 is tilted, the dolly 34 will move slightly rearwardly on the frame 10, but will be prevented from any extended rearward movement on said frame 10 by its abutment with the rollers 61 on the forward ends 63 of the members 32.

This initial partial tilting movement of the dump body without any substantial rearward movement of the dolly 34 is likewise advantageous in that it causes the material within the dump body to move toward the rear thereof, consequently decreasing the weight that must be carried by the dolly through the carriage 52.

After the dump body 20 has tilted a sufficient degree to free the roller 61 from abutment with the side rails 36 of the dolly 34, then, as the dolly 34 is moved horizontally rearwardly on the wheeled supporting frame 10 and the elevating carriage 52 maintained in its elevated position, the tilting of the dump body is progressively increased until it is in final dumping position and the full limit of its dumping movement, as shown in Figure 3.

In order to operate the dolly and the lifting or elevating carriage, an operating means 62 is provided which is most readily observed in Figure 5. This operating means comprises essentially a pair of fixed sheaves attached to the wheeled supporting frame 10 adjacent the rear end thereof, these sheaves being designated by the numerals 64 and 66, respectively, and a guide sheave 68 attached to the frame 10 toward the forward portion thereof. A pulley block 70 is suspended from the top frame member 38 of the dolly 34 intermediate the ends thereof and carries a pair of pulleys 72 therewithin, a traveling block 74 having a pulley 76 journalled therewithin being carried by one of the connecting rods 60 of the carriage 52.

To one of the connecting rods 48 extending between the brackets 40 of the dolly 34 is secured a third pulley block 78 having a pair of pulleys 80 and 82 journaled therein.

A winch 84 is suitably mounted on the forward portion of the supporting frame 10 and a cable wound thereon designated by the numeral 86 passes around the guide sheave 68 and is thence entrained over the guide sheave 64, over the pulley 82 in the block 78, back over the guide sheave 66 on the supporting frame and thence is entrained around the pulley 80 in the block 78 from which it extends upwardly over the pulley 72 in the block 70 and thence down over the travelling pulley 76 in the traveling block 74 and upwardly to a point wherein it is dead-ended in the fixed block 70 by its attachment to the eye member 88.

As the cable is wound on the winch 84, the travelling block 76 and consequently the carriage 52 are drawn upwardly so that the dump body 20 is initially elevated above the side rails 36 of the dolly 34. When the upper limit of this movement is reached, further winding of the cable 86 on the winch 84 draws the dolly 34 toward the fixed sheaves 64 and 66 adjacent the rearward end of the supporting frame 10, consequently moving the dolly and the elevated carriage 52 as a unit horizontally along the frame 10 and thereby increasing the tilting of the dump body. Top frame member 38 supports the dump body during lowering thereof by engaging the undersurface of channel members 32.

In some instances, it may be desirable to utilize a hydraulic hoist for the carriage 52, and when this is desired, the construction shown in Figure 7 is utilized wherein a supporting plate 90 is mounted on top of the cross-braces or connecting rods 48 of the dolly and a vertically extending hydraulic cylinder 92 attached at its lower end thereto. Projecting upwardly from the cylinder is a suitable plunger 94 adapted to be extended and retracted by the action of the piston within the cylinder 92, the free end of the plunger 94 having a pulley 96 thereon. Cable 98 is fixed at one end to one of the connecting rods 60 of the carriage 52 and is entrained intermediate its ends over the pulley 96 being dead-ended at its opposite end on the hydraulic cylinder 92, as by means of suitable lug 98.

Likewise, if desired, the horizontal dolly 34 may be hydraulically operated rather than cable operated as shown without departing from the spirit of the invention.

The dumping mechanism described has found particular utility in conjunction with garbage trailer dump bodies; however, it is obviously adaptable to the dumping of almost any dump box mounted on a supporting frame and pivotally attached thereto.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination, a dump truck chassis frame having horizontal side channel members, a dump body pivoted on said chassis frame for tilting upwardly and rearwardly into partial and final dumping positions respectively, a dolly rising from said chassis frame and having a pair of upright side channel rails, rollers mounted on said channel rails and riding in said horizontal channel members for movement of said dolly rearwardly under said dump body in the partially tilted position of the dump body, a carriage on said dolly having rollers thereon riding in said channel rails for upward movement of said carriage from a lowered position, stop means on said dolly limiting upward movement of the carriage, bottom channel members on said dump body, rollers on said carriage riding in said bottom channel members to tilt said dump body into partial and final dumping positions in response to upward movement of said carriage into its limit of movement and subsequent rearward movement of said dolly beneath said dump body respectively, rollers on said bottom channel members riding upwardly on and off said rails to prevent rearward movement of said dolly until said carriage is in its upward limit of movement, and pully and pull cable means connected to said carriage and dolly to move said carriage upwardly and then exert rearward pull on said dolly in the upward limit of movement of the carriage whereby to tilt said dump body from partial into final dumping positions.

References Cited in the file of this patent

UNITED STATES PATENTS

| 1,588,396 | Winn | June 8, 1926 |
| 2,497,333 | Vermeer | Feb. 14, 1950 |
| 2,679,433 | Wassinger | May 25, 1954 |

FOREIGN PATENTS

| 945,702 | France | Dec. 6, 1948 |